United States Patent [19]
Loro

[11] 3,766,308
[45] Oct. 16, 1973

[54] JOINING CONDUCTIVE ELEMENTS ON MICROELECTRONIC DEVICES

[75] Inventor: Alberto Loro, Ottawa, Ontario, Canada

[73] Assignee: Microsystems International Limited, Montreal, Quebec, Canada

[22] Filed: May 25, 1972

[21] Appl. No.: 256,929

[52] U.S. Cl. .................... 174/68.5, 29/625, 29/628, 339/17 B
[51] Int. Cl. .................... H05k 1/10
[58] Field of Search .................... 174/68.5; 29/625, 29/628; 339/276 R, 276 C, 95 A, 17 B

[56] References Cited

UNITED STATES PATENTS 2,967,979 1/1961 Plesser et al. ................ 317/101 CC

*Primary Examiner*—Bernard A. Gilheany
*Assistant Examiner*—D. A. Tone
*Attorney*—L. Brooke Keneford

[57] ABSTRACT

The invention relates to a method of interconnecting adjacent conductors upon a support member, — particularly in a microelectronic device. The portions of the conductors to be connected are provided with nodules or pads of malleable metal which may be deformed and spread into one another to form a cold weld. The invention is particularly useful for the interconnection of conductive tracks on integrated circuit or similar devices.

21 Claims, 18 Drawing Figures

JOINING CONDUCTIVE ELEMENTS ON MICROELECTRONIC DEVICES

The present invention relates to a method of interconnecting adjacent conductive tracks on a microelectronic device — for example, an integrated circuit or the like — and to apparatus for effecting such method.

An integrated circuit consists of many separate components such as transistors, diodes, resistors, capacitors, etc., fabricated simultaneously on a wafer of semiconductive material, for example, silicon, and organized into a useful circuit function by means of a pattern of interconnecting conductors. Many such circuits are usually fabricated on each wafer, which is later subdivided into separate elements to be subsequently mounted and provided with external electrical connections and packaged, one or more to each package. Larger and more complex circuit functions can then be realized by interconnecting elements within a single package or by interconnecting separately packaged elements.

The maximum practical size and complexity for any one element is limited by considerations of yield due to the inevitable occurrence of more or less randomly distributed defects in the processed wafer, no matter how great the care exercised in processing. The larger the area of the element, the more likely it is to contain a defect which will degrade or destroy its performance; hence yield decreases with element size and in practice sets a limit to the largest size which can be produced economically.

Many types of circuits such as semiconductor memories, shift-registers, logic functions, etc., are normally organized into large functional blocks consisting of many similar elements. It is therefore of great importance from considerations of cost, space, speed of operation and reliability to minimize the number of external connections which have to be made and there is therefore a constant pressure on the semiconductor industry to produce larger and more complex elements.

Any correctly processed wafer will normally contain some elements which are useable and some which are unuseable in a more or less random pattern which is different for every wafer. The useable and unuseable elments are normally identified by making temporary electrical connection to each element in turn by means of moveable probes and then applying suitable electrical test signals. It is then customary to mark bad elements by means of an ink spot so that they can be discarded after separation. The electrical testing and marking is carried out with any one of a number of commercially available test systems.

Many attempts have been made in the past to interconnect the thus identified good elements on the wafer to achieve larger and more complex circuit functions, thereby eliminating the high cost and reliability hazard of separation, mounting and reconnecting separate elements. However, prior art interconnection techniques have experienced serious technical difficulties which are discussed below.

One proposed technique is to fabricate a standard metallic interconnect pattern which connects every element into a large circuit function during wafer manufacture and then to test each element and disconnect those which are unacceptable. The first difficulty with this proposal is that it is difficult and sometimes impossible to obtain valid test data on elements which are already connected into a circuit containing an unknown quantity of other defective elements. The second difficulty lies in the means of effect-ing electrical disconnection of unwanted elements. One means of effecting such disconnection is to fabricate the orginal conductor pattern such that it is connected to each element by a fusible metallic link which may be vaporized by the momentary passage of a high level of current. This presents a problem since reproducible fusible links suitable to serve also as permanent high reliability connections are difficult to design and fabricate. Furthermore, in order to protect the rest of the circuit from the high vaporization current, it is necessary to provide current probe connections on either side of each link, making the links occupy a large part of the total wafer area.

An alternative method of achieving element disconnection is to sever the conductor metal by localized etching. This requires the fabrication of some kind of customized etching mask specific to each wafer. The fabrication of such a mask is costly and in itself is subject to yield due to random defects. Furthermore, the pre-tested wafer must be submitted to a chemical etching process, with the attendant high risk of introducting new defects which would invalidate the test data.

An alternative approach to the aforementioned techniques is to fabricate the metallization pattern with small gaps at each element, so that all elements are initially isolated from the circuit but may be connected into it by electrically bridging the appropriate gaps. In various prior art proposals utilizing this approach, additional metal is applied to the circuit by vacuum deposition to provide these bridges. This has required the generation of custom masks, either to act as a stencil to localize the deposition of metal over the gaps, or as an etching mask to remove unwanted metal from a thin deposited film covering the whole surface. These approaches suffer from the aforementioned difficulties associated with cost and complexity of mask fabrication, mask yield, processing yield and accumulation of processing damage on the pre-tested wafer. When the original metal pattern is aluminum there is an additional problem in obtaining good low resistance electrical contact by subsequently deposited metals due to the natural oxide skin which occurs on aluminum. Furthermore, since the connection process must be almost perfect to be of any value, the occurrence of even one defective link or one more defect created in the first metal pattern calls for rejection or, at least, a complete rework through the mettallization processes.

The present invention provides a method of fabricating discretionary metallic links having excellent electrical properties whilst avoiding the aforementioned difficulties. Hence by application of this invention, very large scale integration on the wafer becomes a practical reality.

Thus, according to the present invention, the ends of two conductor tracks to be interconnected are laid quite close to one another and a nodule or pad of malleable metal — for example, gold — is formed upon each track end during manufacture. The tracks may later be interconnected simply by the pressure of a tool upon the nodules which will spread the nodules into one another and effectively form a cold weld which displays high durability and very low contact resistance. As will be realized from a consideration of the following description, the invention is by no means confined to the discretionary interconnection of conductive paths on large-scale integrated circuitry for the purposes discussed above, but indeed may be employed, for example, in thick or thin film circuits and for any purpose wherein a connection is to be made between adjacent conductive tracks. The metal used for the nodules or pads may be gold, silver, aluminum or tin/-lead alloy.

The invention will now be described further by way of example only and with reference to the accompanying drawings in which.

Figure 1:
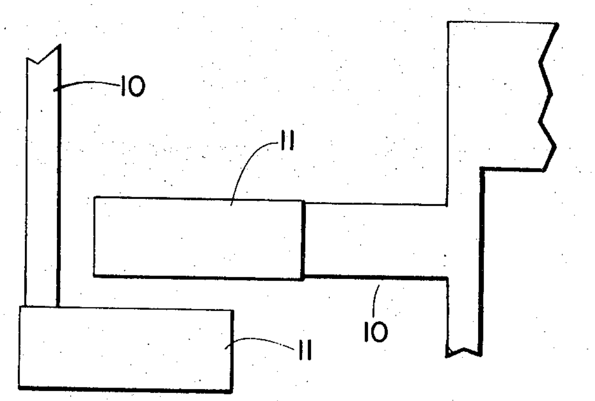
FIG. 1 is a plan view of pads welding upon conductive track-ends prior to elding according to the invention.
Figure 1A:
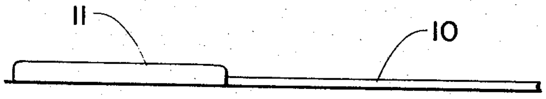
FIG. 1A is a side elevation of a pad shown in FIG. 1.
Figure 2:
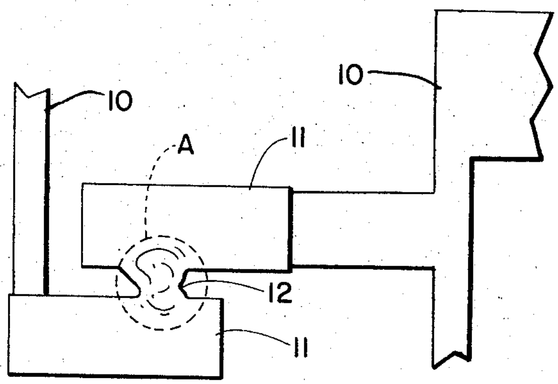
FIG. 2 is a plan view of the weld formed between the pads of FIG. 1.

Turning now to the drawings, FIG. 1 shows portions of metallic tracks 10 of a circuit, which may be, for example, an integrated circuit, a thick — or thin-film circuit, etc. The tracks terminate in adjacent ends, which are built up as pads 11. FIG. 1A shows a side elevation of a track portion 10 with a raised pad 11, and it will be seen that the pad 11 is substantially greater in depth than the track 10. Typically, the pad is about 12 microns deep and about 4 mils wide and 11 mils long and as such is of the same dimensions as the beams conventionally formed on beam lead devices. The gap between adjacent edges of the pads is about 0.5 mils. A tool is applied downwardly upon the adjacent edge portions of the pads 11 and the pad material spread out to bridge the gap between the pads as shown at 12 in FIG. 2. Various tool shapes may be employed and FIG. 2 shows a typical weld shape when a needle with a flat lapped end is used. Bonds formed in this manner have been found to have extremely low resistance values — typically 0.002 ohms to 0.005 ohms and should withstand up to 2 amps peak pulses.

This form of the invention was the prototype which I employed to demonstrate the viability of my concept. However, this particular embodiment suffers from certain disadvantages, namely that a large area of pad material is used for a relatively small weld and a fairly sharp welding tool, for example, a sewing needle, is needed to effect the weld, as pressure must be applied at the adjacent edges of the pads.

Figure 3:
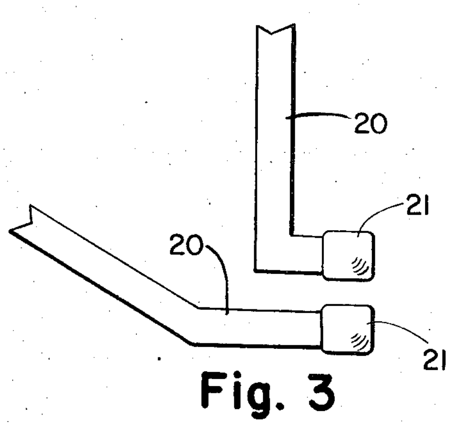
FIG. 3 is a plan view of nodules formed upon conductive track-ends prior to welding according to the invention.
Figure 3A:
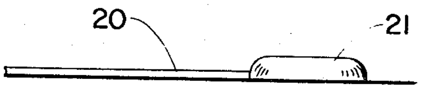
FIG. 3A is a side elevation of a nodule shown in FIG. 3.
Figure 4:
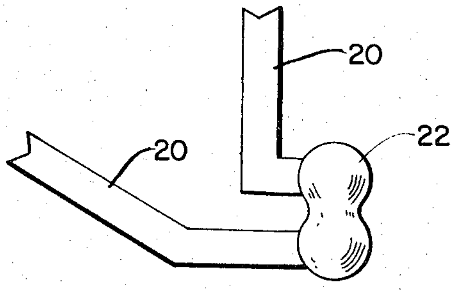
FIG. 4 is a plan view of the weld formed between the nodules of FIG. 3.
Figure 5:
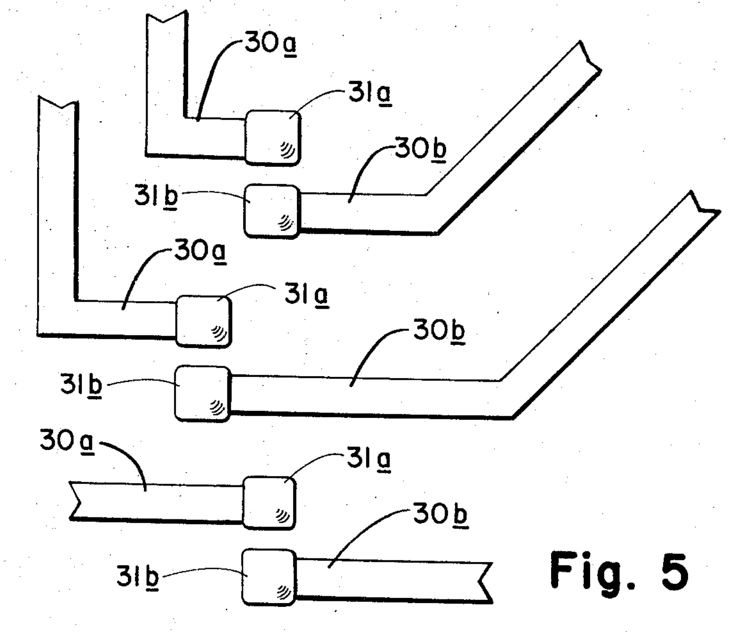
FIG. 5 is a plan view of a plurality of clustered nodules similar to those of FIG. 3.
Figure 6:
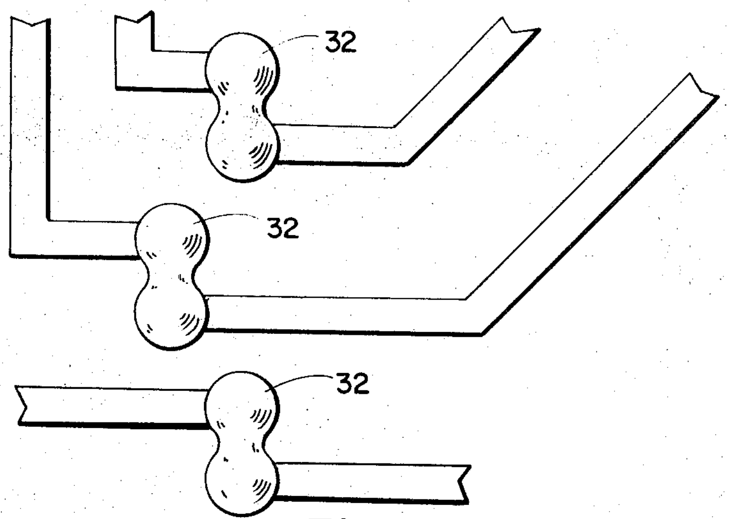
FIG. 6 is a plan view of welds formed from the nodules of FIG. 5.

FIG. 3 shows an alternative and more practical form of the invention wherein nodules 21 are used on the end portions of metallic tracks 20. FIG. 3A shows a track portion 20 with a nodule 21 formed thereon. The nodules are approximately 13 microns deep and about 18 microns wide, the tracks being about 12 microns wide. The track ends are spaced by about 12 microns and adjacent edges of nodules by almost 6 microns. Downward pressure of a bonding tool causes the nodules 21 to spread and form a cold weld 22 between the tracks 20, as shown in FIG. 4. Now, it will be seen that instead of the relatively small weld area A in FIG. 2 being formed, almost the entirety of each nodule is employed in the weld, thus optimizing the chip real estate for this purpose. Also, this embodiment has the advantage that a welding tool can be used which will cover the area of the nodules without the need for precise positioning of the tool. This latter feature is demonstrated in FIG. 5 wherein pairs of opposed track ends to be joined are shown. Track ends 30*a* communicate with a module of circuitry under test and track ends 30*b* are interconnections to other portions of the circuitry. The track ends to be interconnected are formed as shown in opposed fashion with malleable metallic nodules 31*a* and 31*b* thereupon, each nodule 31*a* being spaced from its respective opposed nodule 31*b* by about 6 microns. Adjacent pairs of nodules are sufficiently spaced that they will remain separate, even when the nodules are deformed. The track ends to be bonded are clustered away from other parts of the circuit to which the bonding tool must not be applied and individual track end pairs are preferably spaced from one another by 5 mils or more measured from points mid-way between adjacent nodules in order to ensure isolation of the bonds from one another. A flat tool of appropriate shape and dimensions — for example, a circular or square face of diameter or diagonal length of about 50 mils — is applied to the nodules 31*a* and 31*b* with a force of approximately 64 grams per nodule pair to form welds 32 as shown in FIG. 6. By using a tool of considerably larger work-face area than the area occupied by the nodules, the need for precise placement of the tool is again avoided. In this example, the total bond area was about 1,400 square microns and the bond per unit area of final bond about 0.39 grams per square micron.

Considering gold nodules of dimensions 25 microns × 25 microns and 11 microns deep, the nodules being spaced by 5 microns between adjacent edges, a compressive load of 300 grams at room temperature spreads the nodules to again give a total bond area of approximately 1,700 square microns. The load per unit area of final bond in this case is about 0.17 grams/-square micron. This is in the range of 10 to 20 grams/-square mil commonly used for thermo-compression bonding. Thus it can be seen that a wide range of bonding pressures can be employed without significantly altering the final bond area.

Figures 7, 8:
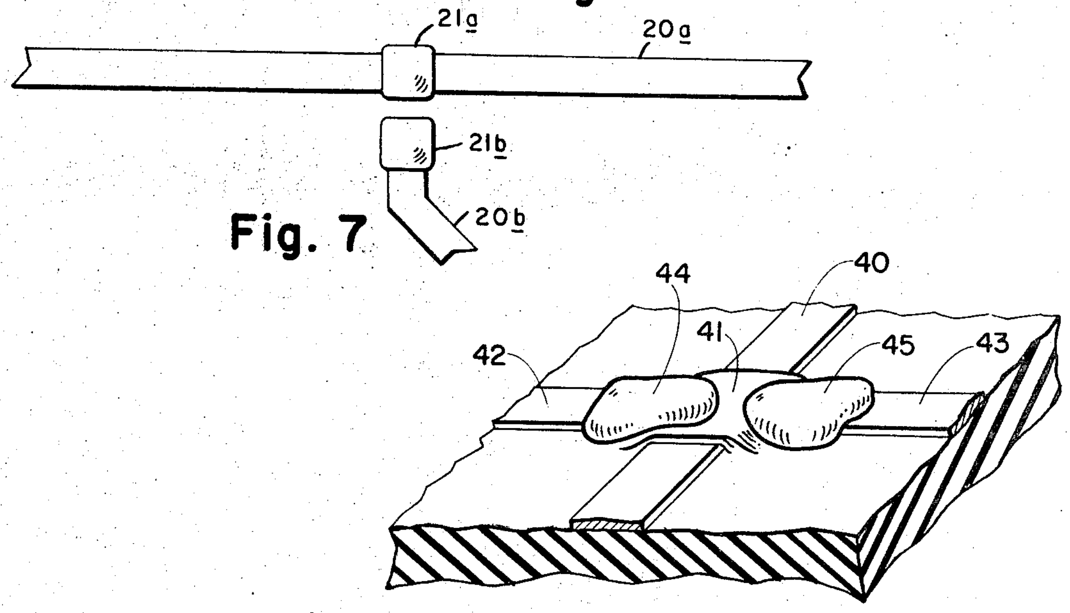
FIG. 7 is a plan view of nodules formed according to a further aspect of the invention.
FIG. 8 is a plan view o of nodules formed at a crossover junction.

Although the above examples show the clustering of track-ends having nodules thereupon, it will be realized that adjacent track areas, whether they are track-ends or areas of straight-through track portions, may equally well be provided with nodules and bonded together. This concept is shown in FIG. 7, wherein the nodule 21a is located upon a straight-through track portion 20a and the nodule 21b is located upon an adjacent track-end 20b. The nodules are deformed and spread into welding contact in the same manner as above.

Figure 8A:
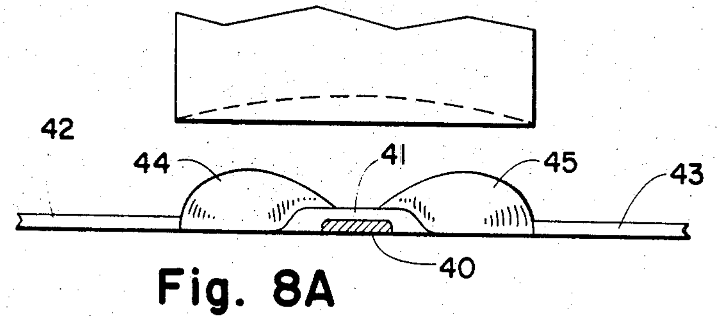
FIG. 8A is a side elevation of the nodules of FIG. 8.
Figure 8B:
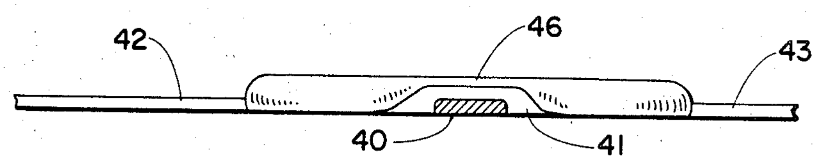
FIG. 8B is a side elevation of the nodules of FIG. 8 formed into a weld.

FIGS. 8 and 8A show a further embodiment of the invention wherein a welded joint is used to form a cross-over link. A conductor track 40 is to be crossed by a second conductor track. A dielectric bridge 41 formed over the track 40 and opposed tracks 42 and 43 are deposited on each side of the bridge 41. Malleable metal nodules 44 and 45 are formed on each track end, the adjacent edges of the nodules being separated by about 6 microns. Downward pressure of a bonding tool will again spread the nodules, forming a weld 46, as shown in FIG. 8B. A normal bonding pressure of about 60 grams will not damage the bridge 41 and track 40 beneath the weld.

In any of the above examples, heat may be applied to the nodules through the bonding tool, reducing the pressure of the tool required to deform and weld the nodules if conditions dictate that such a reduced tool pressure must be used.

Figure 9:
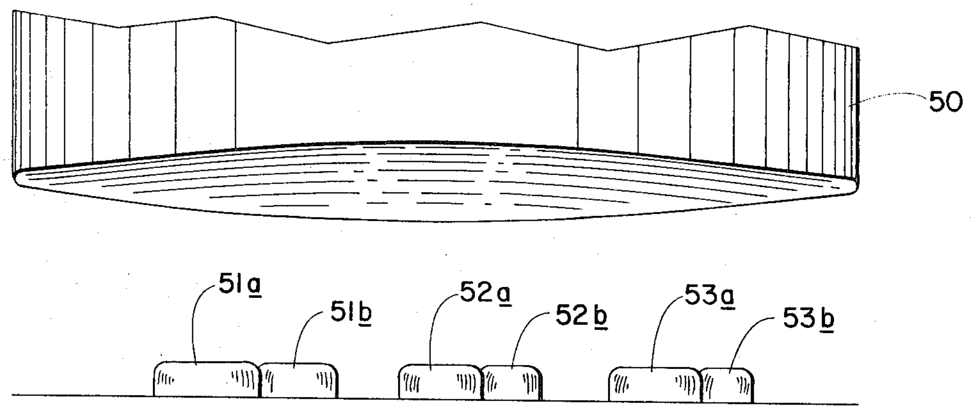
FIG. 9 is a side elevation of a bonding tool descending upon the nodules of FIG. 5 prior to welding.

The shape of the bonding tool work-face may be flat or dished. In FIG. 9, a flat bonding tool 50 is shown in side elevation, poised above a number of nodule pairs 51a, 51b; 52a, 52b; and 53a 53b. Clearly, where multiple bonds are to be made by the same tool, a flat work-face is preferable, so that each nodule pair is contacted at approximately the same time by the work-face and receives the same amount of deformation.

Figure 10A:
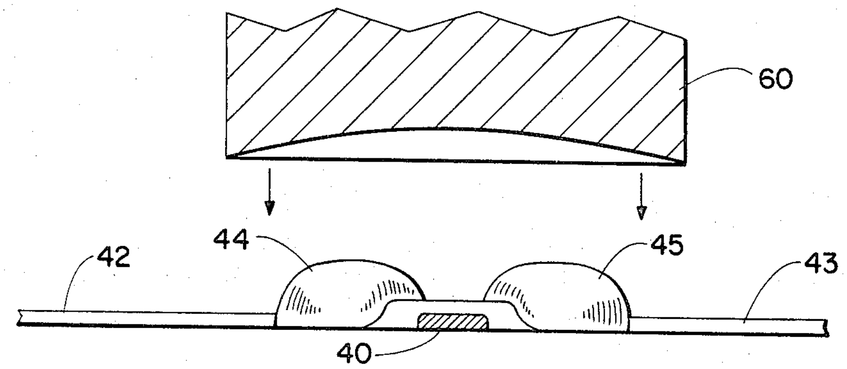
FIGS. 10A, 10B and 10C show stages during the welding of the nodules of the crossover structure of FIG. 8.
Figure 10B:
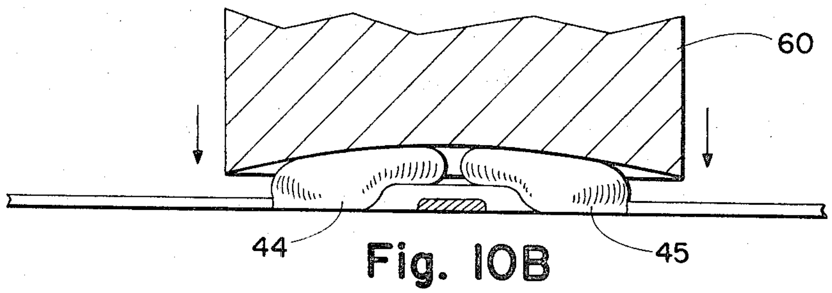
Figure 10C:
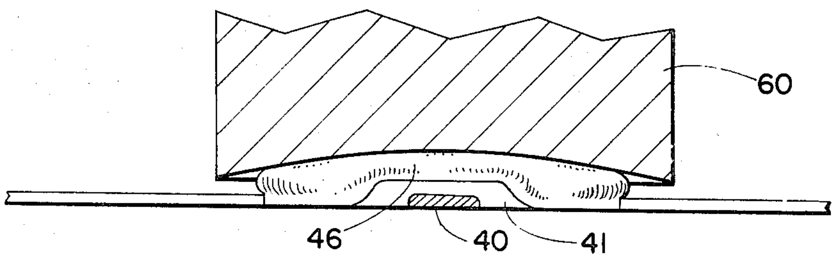

FIG. 10A shows a dished work-face on a bonding tool 60 poised above a cross-over, such as that shown in FIG. 8. This is an example of where a dished work-face is advantageous because only one nodule pair is involved and the profile of the cross-over is such that it is preferable that the nodules be deformed towards one another in preference to other directions. In FIG. 10B, the work-face is shown in cross-section during the process of defining the nodules 44 and 45, and the effect of preferentially deforming the nodules towards each other in preference to other directions is clearly shown. FIG. 10C shows the bonding tool 60 at the bottom of its downward stroke and it will be seen that the thickness of the weld 46 is considerably greater than the corresponding weld in FIG. 8B, which Figure shows the type of weld formed by a flat-faced tool. In other words, the weld in FIG. 10C is formed at a lesser depth of tool stroke than the weld of FIG. 8B, because the nodule metal is preferentially squeezed towards the weld area. This, of course, also results in less metal being squeezed out around the weld area, giving a substantially smaller total weld area. This can be important if the weld is in close proximity to other metallization which it must be isolated from. For example, in the case of the cross-over of FIG. 8, it is important that the weld metal is not deformed over the edges of the bridge dielectric 41 into contact with the metal track 40.

Figure 11:
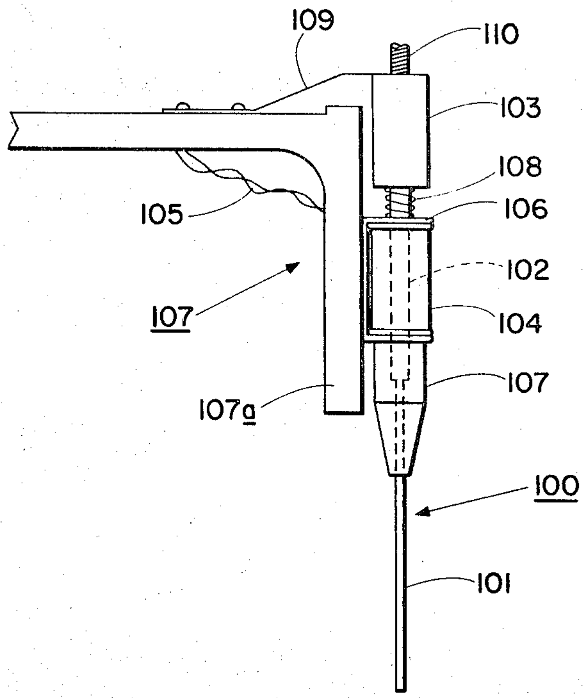
FIG. 11 is a side elevation of a welding tool for use with the present invention.

FIG. 11 shows apparatus according to one form of the invention for squeezing the metal nodules into a weld under controlled pressure and temperature. The apparatus comprises a worktable (not shown) upon which the work-piece is placed. The worktable preferably is of the type commonly employed in test-probing apparatus. Test-probing apparatus commonly comprises a number of test-probes and an inker probe located above the work-table containing the device to be tested, the work-table being movable to bring selected portions of the device beneath the probes in order for test-probing to be performed. Defective devices are then stamped with the inker probe. The table may be moved manually while the device is observed by means of a microscope or, as is more commonly employed in mass-production testing, under the influence of motors which move the table according to a predetermined program based upon the required testing sequence. Thus the work-table employed in the present apparatus may conveniently be of this type.

The tool and tool-holder are shown in FIG. 11. The tool 100 comprises a needle 101, having a flat or dished end as described above, communicating with an elongated slug portion 102 coaxial with the needle 101. The extremity of the slug portion 102 remote from the needle 101 is threaded and is in threaded engagement with an elongated nut 103. The slug portion 102 slides within an electromagnet coil 104 which is energized through wires 105. The coil 104 is held within a yoke member 106, which is attached to a limb 107a of a generally L-shaped frame member 107. The yoke member 106 is channel-shaped having the coil 104 located between its walls and having an orifice in each wall corresponding to the central orifice through the coil and permitting the slug portion 102 to freely pass therethrough. The outside edge of the lower wall of the yoke member 106 has a generally chuck-shaped guide member 107 fastened thereto within which the slug portion 102 and the needle 101 are slidably accommodated. A compression spring 108 is located around the slug portion 102 and between the upper wall of the yoke member 106 and the nut 103, such spring tending to urge the nut 103 — and hence the complete tool assembly 100 — in an upward direction. The upward limit of travel of the nut 103 is defined by a springy metal strip member 109 fastened to the horizontal limb of the L-shaped frame member 107 and extending to abut the top surface of the nut 103 when the tool 100 is in its normally received position as shown in the drawing.

The apparatus functions as follows. The work-piece is located upon the work-table of the machine and moved into position so that the nodules to be welded are located beneath the needle 101. A current pulse is then applied through the wires 105 to the coil 104 whereupon the slug portion 102 and hence the entire tool assembly 100 is moved downwards, bringing the needle 101 into contact with the nodules to be welded. Upon the termination of the current pulse to the coil 104, the nut 103 — and hence the entire tool assembly 100 — is pushed inwardly under the influence of the compression spring 108, until the top surface of the nut 103 contacts the metal strip member 109 which prevents the tool assembly from further upward travel.

The force with which the needle 101 impinges upon the nodules being welded may easily be selected. For example, if it is desired that the needle should impact the nodules with a percussive blow, the spring 108 would be chosen to be weak relative to the force exerted by the coil 104 when energized — thus a relatively strong current pulse of short duration would be applied. If, however, the nature of the connected to be made is such that it is undesirable to use a percussive blow from the needle 101 but, rather, a uniform pressure from the needle should be employed, the current pulse may be tailored to be of larger duration and of increasing magnitude to match the increasing upward force exerted by the spring 108 as it is compressed.

As stated above, heat may be applied to the nodules during application of the tool thereto and in order to provide such heat to the needle 101, a small heating coil may conveniently be placed around the needle, or the needle may be formed to incorporate a resistive heating element therein.

Various uses for the present invention have been mentioned, the foremost of which being the selective interconnection of conductors and circuit elements after probe testing of such elements. Other examples of applications to which the invention is particularly suited are as follows.

Figure 12:
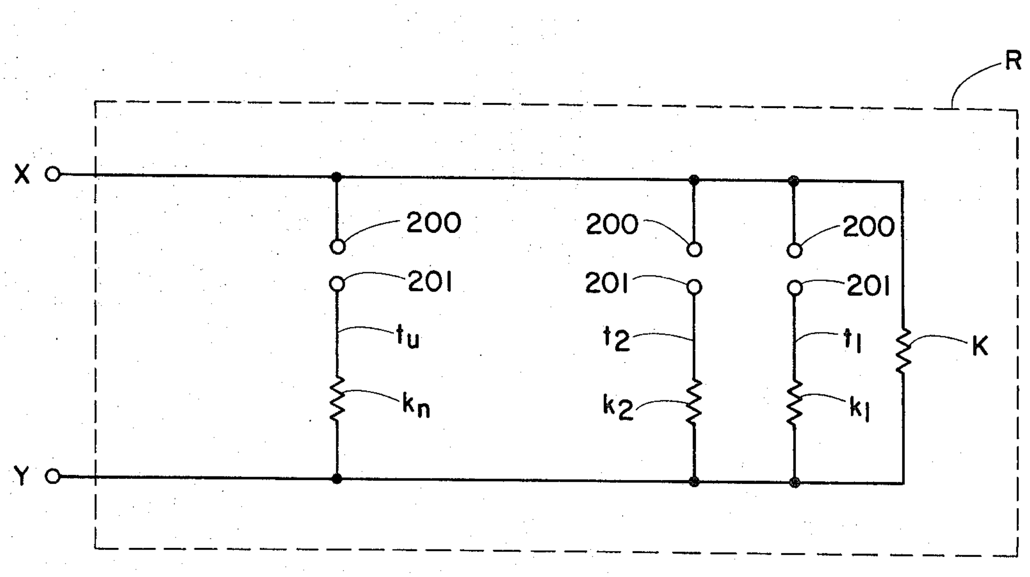
FIG. 12 is a schematic diagram of a circuit to which the bonds of the present invention are particularly suited.

In the fabrication of thick and thin-film resistors it is often required to trim the resistor to value after fabrication and having regard to the various other circuit parameters which are not ascertainable prior to device fabrication. This is often achieved by forming a main resistor having a value somewhat larger than the approximate value to which it is known that the resistor will require to be trimmed subsequent to device fabrication, and forming in parallel with the resistor a number of resistors of relatively large value. This arrangement is shown in FIG. 12. The main resistor K is connected across the appropriate part of the total circuit, such connection being designated by terminals X and Y. A number of larger resistors $k_1, k_2, \ldots k_n$ are located in parallel with the resistor K but the conductive tracks $t_1, t_2 \ldots t_n$ connecting the respective resistors to one end of the resistor K are interrupted and the opposed pairs of track ends each provided with nodules 200 and 201. The values of the resistors are chosen so that $$1/K + 1/k_1 + 1/k_2 + \ldots 1/k_n \leq 1/R \text{ min.}$$

wherein R min. is the minimum resistance value possible for the total resistor R; and $$1/K \geq 1/R \text{ max.}$$

wherein R max. is the maximum resistance value possible.

Now, once the required value for R is ascertained, a very close approximation to this value may be provided by selectively inserting the resistors in circuit by forming bonds in the manner according to the invention between 15 the nodules 200 and 201.

Precisely the same technique may be employed for trimming thick or thin-film capacitors to value. If capacitors C, $c_1, c_2, \ldots c_n$ are substituted for the resistors K, $k_1, k_2, \ldots k_n$ respectively in FIG. 12, the capacitor values are now chosen so that $$C + c_1 + c_2 + \ldots c_n \geq C \text{ max.}$$

wherein C max. is the maximum value possible for the finally trimmed total capacitor; and $$C \leq C \text{ min.}$$

wherein C min. is the minimum capacitance value possible.

A further application to which the technique of the present invention is eminently suited is the "burn-in" of devices prior to final testing and scribing. This is conveniently done by forming an interconnection network of, for example, silver upon a wafer containing a number of devices. The device conductors are gold and interconnection nodules according to the invention are appropriately formed between adjacent interconnection network track ends and device conductor track-ends. The devices are tested individually and operative devices are then connected into the main interconnection network by welding of the nodule pairs in the manner of the invention and the devices then powered — or "burnt-in"—0 through the interconnection network for a specified time. After this "burn-in" period has elapsed, the interconnection network is removed by selective etching using, for example, nitric acid, which will not attack the gold device conductor tracks and the devices again tested individually. Defective devices are then marked and the wafer diced into individual devices, the defective devices being discarded. This technique is particularly valuable where high-reliability devices are required.

Various further embodiments of the invention will be readily apparent to those skilled in the art without departing from the spirit and scope of the invention as exemplified and described herein and defined in the claims appended hereto.

What is claimed is:

1. A method of forming elements joint between a plurality of adjacent, spaced electrically conductive elemnts situated upon a support member, said method comprising the steps of forming upon at least the adjacent areas of said electrically conductive elements raised areas of malleable metal and applying pressure to said areas of malleable metal causing said areas to deform and spread into welding contact one with another.

2. The method of claim 1 wherein said adjacent, spaced electrically conductive elements are conductors deposited upon a substrate member forming part of a microelectronic device.

3. The method of claim 1 wherein said raised areas are pads of malleable metal.

4. The method of claim 1 wherein said raised areas are nodules of malleable metal.

5. The method of claim 4 wherein said nodules are of a metal selected from the group consisting of gold, silver, aluminum and tin/lead alloy.

6. The method of claim 4 wherein said nodules are of dissimilar metals selected from the group consisting of gold, silver, aluminum and tin/lead alloy.

7. A method of forming a joint between a plurality of adjacent, spaced electrical conductors deposited upon a substrate surface and forming part of a microelectronic device, said method comprising the steps of forming at the adjacent areas of said conductors nodules of malleable metal and applying pressure to said nodules causing deformation thereof and spreading of the metal of each of said nodules into welding contact with the metal of the remaining nodules.

8. The method of claim 6 wherein said microelectronic device is an integrated circuit.

9. The method of claim 7 which comprises applying pressure to said nodules as aforesaid by means of a bonding tool comprising a needle means having a substantially flat work-face, said work-face being forced into contact wih said nodules in a direction substantially normal to said substrate surface.

10. The method of claim 7 which comprises applying pressure to said nodules as aforesaid by means of a bonding tool comprising a needle means having a substantially dished or concave work-face, said work-face being forced into contact wih said nodules in a direction substantially normal to said substrate surface.

11. In a microelectronic device, a support member adapted to receive electrical components thereupon and conductive elements located upon said support member for interconnecting said electrical components, selected ones of said conductive elements having areas isolated from but lying in close proximity to adjacent corresponding areas of selected others of said conductive elements, each of said areas having a raised area of malleable metal located thereupon, the raised areas of malleable metal on corresponding areas being of such shape, volume and proximity to each other as to flow together and form a weld when a compressive force normal to the support member is simultaneously applied to said raised areas.

12. The structure of claim 9 wherein said raised areas are pads of malleable metal.

13. The structure of claim 9 wherein said raised areas are nodules of malleable metal.

14. The structure of claim 13 wherein said nodules are of a metal selected from the group consisting of gold, silver, aluminum and tin/lead alloy.

15. The structure of claim 9 wherein said microelectronic device is an integrated circuit.

16. In a microelectronic device, a support member adapted to receive electrical components thereupon and conductive elements located upon said support member for interconnecting said electrical components, selected ones of said conductive elements having areas isolated from and adjacent areas of selected other said conductive elements, each of said areas having a raised area of malleable metal located thereupon and the raised metal areas of each of one or more selected groups of adjacent conductor areas being deformed and spread into welding co-relationship with each said group in order to electrically interconnect said adjacent conductor areas.

17. The structure of claim 14 wherein said raised areas are pads of malleable metal.

18. The structure of claim 14 wherein said raised areas are nodules of malleable metal.

19. The structure of claim 18 wherein said nodules are of a metal selected from the group consisting of gold, silver, aluminum and tin/lead alloy.

20. The structure of claim 18 wherein said nodules are of dissimilar metals selected from the group consisting of gold, silver, aluminum and tin/lead alloy.

21. The structure of claim 14 wherein said microelectronic device is an integrated circuit.

* * * * *